United States Patent [19]

Quick et al.

[11] 4,215,576
[45] Aug. 5, 1980

[54] OPTICAL TEMPERATURE SENSOR UTILIZING BIREFRINGENT CRYSTALS

[75] Inventors: William H. Quick, La Habra Heights; Kenneth A. James, Corona del Mar; Virgil H. Strahan, Orange, all of Calif.

[73] Assignee: Rockwell International Corporation, El Segundo, Calif.

[21] Appl. No.: 5,618

[22] Filed: Jan. 22, 1979

[51] Int. Cl.² .......................................... G01K 11/14
[52] U.S. Cl. .................. 73/356; 73/362 R; 356/365
[58] Field of Search ............ 73/356, 362 R; 356/365; 350/157, 159

[56] References Cited

U.S. PATENT DOCUMENTS

| | | | |
|---|---|---|---|
| 3,950,987 | 4/1976 | Slezinger | 73/362 R |
| 4,072,055 | 2/1978 | Elliot | 73/356 |
| 4,111,050 | 9/1978 | Waddoups | 73/356 |

Primary Examiner—Gerald Goldberg
Assistant Examiner—Denis E. Corr
Attorney, Agent, or Firm—Fischer and Tachner

[57] ABSTRACT

A temperature sensor comprising an optical transducer member having an array of birefringent crystals. The length and, accordingly, the sensitivity to temperature change of successive birefringent crystals varies according to a particular relationship. The transducer is interconnected with a fiber optic transmission and detecting system. Respective optical output signals that are transmitted from the birefringent crystals via the fiber optic transmission system are detected and decoded so as to correspond to digits of a numbering system, whereby an accurate digital representation of temperature can ultimately be provided.

16 Claims, 7 Drawing Figures

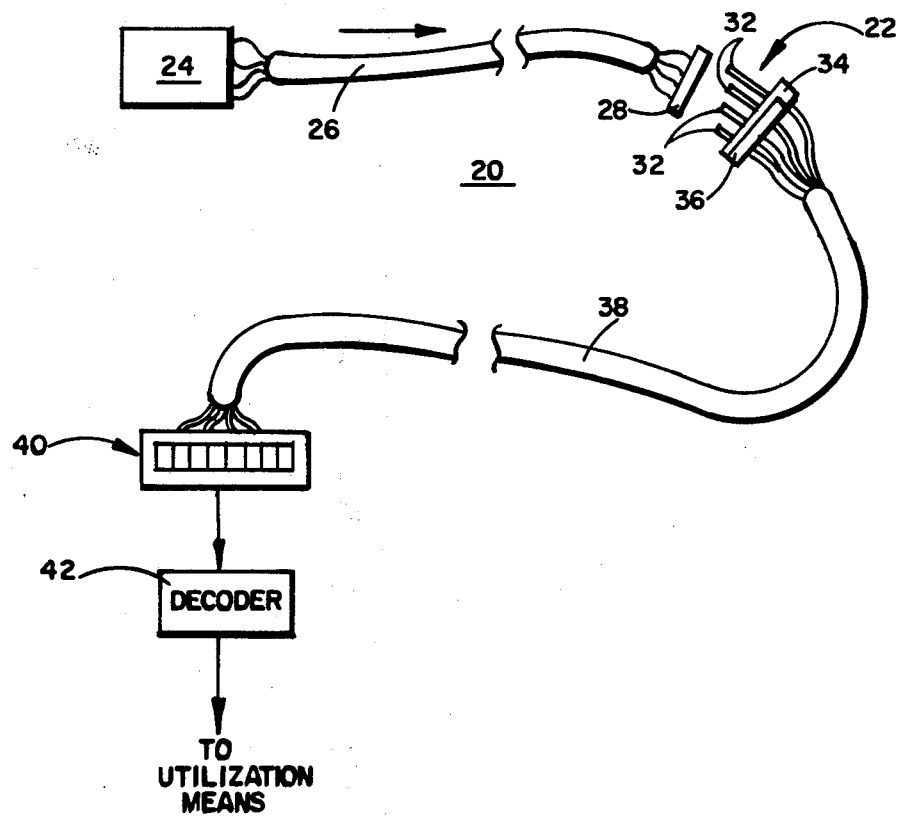
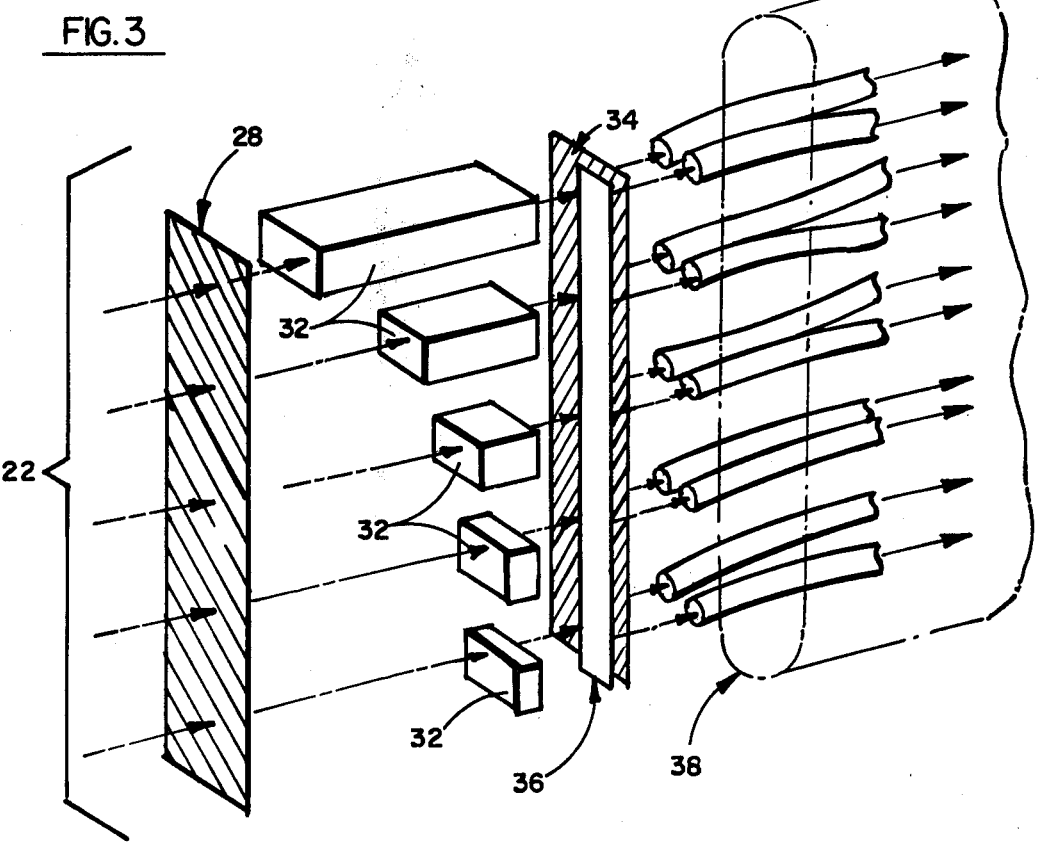
FIG. 3

OPTICAL TEMPERATURE SENSOR UTILIZING BIREFRINGENT CRYSTALS

The invention described herein was made in the performance of work done under NASA Contract NAS3-21005 and is subject to the provisions of section 305 of the National Aeronautics and Space Act of 1958 (72 Stat. 435; 42 USC 2457).

BACKGROUND OF THE INVENTION

1. Field of the Invention

This invention relates to an optical temperature sensor and to an associated fiber optic transmission system, which sensor employs birefringent crystals, the outputs of which can be decoded to provide a digital representation of temperature.

2. Prior Art

Few temperature sensors are known which are compatible with a fiber optic transmission system, which sensor and transmission system are remote from a central computing apparatus. Therefore, the prior art temperature sensors are not compatible with digital systems, whereby a digitally encoded output signal could be obtained from an optical input signal. However, an example of a temperature sensor that is adapted to be interfaced with a fiber optic transmission system to provide accurate digital representations of temperature can be found in U.S. Application Ser. No. 928,223 entitled FIBER OPTIC TEMPERATURE SENSOR, filed July 26, 1978.

More particularly, conventional temperature sensors supply analog representations of a temperature signal. Consequently, should a digital representation of an output signal be desired, relatively expensive and space consuming analog-to-digital equipment is required. Moreover, such conventional temperature sensors are limited in application, because of their inherently large size and slow response time. What is more, either complex transmission lines or signal conversion apparatus is typically required when the temperature sensor must collect information from a remote sample. Hence, prior art transmission systems that have heretofore been interfaced with temperature sensors of the prior art are relatively expensive to fabricate, are not capable for carrying sufficiently wide bandwidth signals, lack immunity to electro-magnetic and/or electro-static interferences, and require numerous interfacing apparatus.

SUMMARY OF THE INVENTION

Briefly, and in general terms, an optical temperature sensor system is disclosed which includes a unique sensing transducer. The transducer comprises a pair of crossed polarizer elements and an array of birefringent crystals positioned therebetween. The lengths of successive birefringent crystals are varied according to a particular mathematical relationship. Accordingly, the larger the crystal length, the greater the sensitivity thereof to temperature change. An optical output signal produced by each birefringent crystal is processed so as to correspond to a digit from a conventional numbering system, whereby an accurate digital representation of temperature is provided.

The sensing transducer is interfaced with a light intensity modulated fiber optic transmission system. An input bundle of coherent optical fibers supplies incident light to each of the birefringent crystals of the sensing transducer. An output bundle of incoherent optical fibers transmits the respective output optical signals from the crystals to a photo-electric detector, so that an electrical representation of temperature can be achieved. In one preferred embodiment of the invention, the output bundle includes a pair of optical fibers to transmit the output signals generated by each crystal. Each pair of optical fibers corresponds to a respective digit of the number that is representative of temperature. Each one of a pair of output optical fibers transmits one half of a quadrature pair of signals, which pair of signals are ninety degrees out of phase from one another. The magnitude of the quadrature pair of signals varies sinusoidally with temperature. By detecting and decoding the temperature or digit that corresponds to the particular amplitude of the quadrature pair of signals generated by each crystal, a technique of successive approximations may be employed to ultimately determine an accurate digital representation of the temperature sensed by the present sensing transducer.

BRIEF DESCRIPTION OF THE DRAWINGS

FIG. 3 of the drawings shows a light intensity modulated, fiber optic transmission system including an optical transducer that is fabricated according to the teachings of FIG. 2 for detecting remote temperatures.

FIG. 4 of the drawings is a detailed enlargement of the optical transducer utilized in the fiber optic transmission system of FIG. 3.

DESCRIPTION OF THE PREFERRED EMBODIMENT

As will be understood by those skilled in the art, materials existing in a crystalline state are optically distinguishable from materials existing in other physical states, inasmuch as crystals are generally electrically anisotropic. That is, the polarization produced in a crystalline structure by a particular electric field is not simply the product of a scalar constant multiplied by the magnitude of the electric field. However, crystal polarization varies according to a relationship that is dependent upon the direction of the applied electric field relative to the crystal lattice. As a result of this phenomenon, the speed of propagation of an incident light wave through a crystal lattice structure is a function of both the direction of propagation and the polarization of the incident light beam. Generally, for the majority of known crystal lattice structures, two different phase velocities are available for any corresponding direction of light wave propagation. These two velocities are associated with the mutually orthogonal polarization of the incident light wave. Hence, materials existing in the crystalline state are normally characterized as double refracting (i.e. birefringent). However, it is not to be assumed that not all crystals are birefringent. By way of example, symmetrical cubic crystals, such as those which comprise the compound sodium chloride, do not exhibit double refraction properties and, therefore, cannot be characterized as birefringent.

Figure 1:
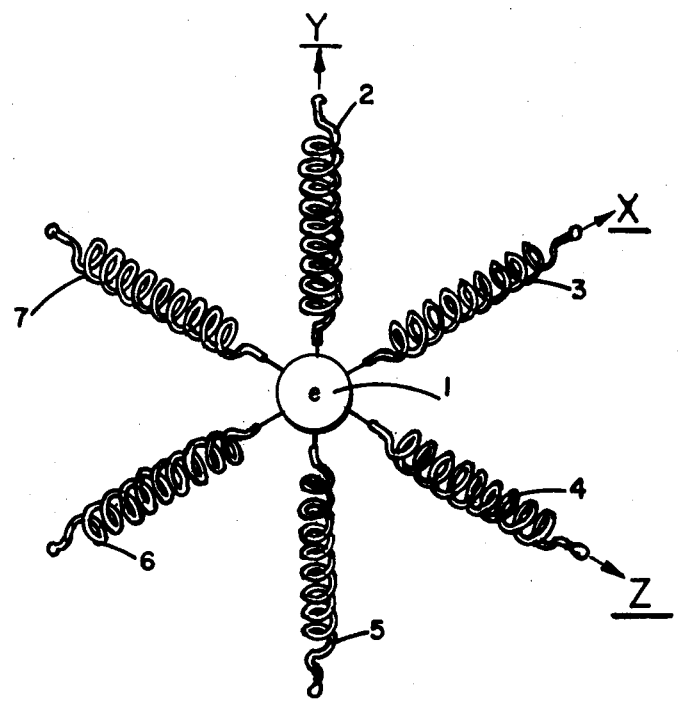
FIG. 1 of the drawings is illustrative of a model that is exemplary of the anisotropic polarization of a crystal.

Referring to FIG. 1 of the drawings, a convenient model is illustrated of the anisotropic polarization of a crystal. A field bound electron 1 of a crystalline material is depicted in the model of FIG. 1 as being centrally attached to a set comprising three pairs of fictitious elastic springs 2, 3, 4, 5, 6, and 7. One of the three pairs of springs 2, 3 and 4, 5 and 6, 7 is respectively aligned with the electron 1 along each of the three orthogonal axes that orient the lattice structure. Springs 2-7 have different coefficients of elasticity for each of the possible directions in which electron 1 may be displaced from its position of equilibrium within the crystal lattice. The magnitude of the displacement of electron 1 as a result of an applied external electric field accordingly depends upon the direction and magnitude of the field. Moreover, the magnitude of the displacement of electron 1 is also affected by the direction and magnitude of the incident light polarization. What is more, the respective stiffnesses of springs 2-7 are functions of temperature, so that electron displacement varies, not only with the magnitude and direction of both the electric field and light polarization, but with temperature, as well.

Figure 2:
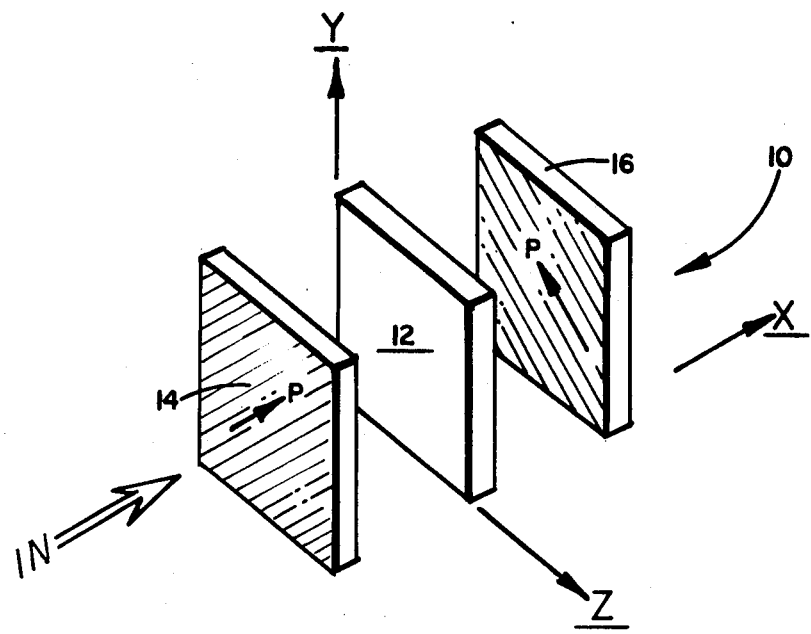
FIG. 2 of the drawings shows a schematic of the temperature sensing optical transducer of the present invention employing the crystal model of FIG. 1.

In accordance with the present invention, the crystal model of FIG. 1 is applied to the implementation of a unique temperature sensing transducer 10. Such a temperature sensing transducer 10, having particular application where high resolution is required over a wide temperature range, is illustrated in FIG. 2 of the drawings. Transducer 10 comprises a birefringent crystal element 12 sandwiched between a pair of crossed polarizer elements 14 and 16. In operation, a supply of incident light, designated IN, is transmitted to the transducer 10. The spectral components of the incident light are transmitted through first polarizer element 14. The resulting polarization vector is then rotated by the birefringent crystal element 12 through an angle, which angle is proportional to temperature. As will be illustrated in greater detail hereinafter, the second polarizer element 16 causes the light intensity to vary sinusoidally with temperature.

FIG. 3 of the drawings shows a compact, low cost fiber optic, light intensity modulated transmission and detection system including a birefringent temperature sensor 20 that is adapted to provide accurate measurements of temperature from a remote sample. A source of incident light 24 supplies light over a broad spectrum to an input bundle 26 of (e.g. four) well known glass or quartz, coherent illuminating optical fibers. The incident light from source 24 is transmitted through the bundle 26 of fibers to a first polarizer element 28 of sensor transducer member 22. Transducer member 22 is fabricated according to the teachings previously disclosed herein when referring to FIG. 2. By way of example, transducer 22 includes a suitable member (e.g. four) of birefringent, temperature sensing crystals 32, which crystals are illuminated by the incident light through first polarizer element 28. Although four birefringent crystals 32 are illustrated in the temperature sensor 20 of FIG. 3, it is to be understood that the number of crystals utilized would vary according to the resolution required of the sensor and to the number of resolution elements which the transmission system is designed to provide for each crystal.

In a preferred embodiment of the present invention, each birefringent crystal 32 has a particular length and, accordingly, a corresponding sensitivity to temperature. The longer length crystals provide the greatest sensitivity to temperature change, because more rotations of the plane of polarization are possible therein. Hence, the respective optical output signal of each birefringent crystal 32 can be processed so as to correspond to a bit from a conventional digital coding scheme. The birefringent crystals 32 are particularly sized according to a relationship that is dependent upon the base of the numbering system used to represent the digital coding scheme. For example, if the optical output signals from crystals 32 are converted to a binary sequence, the length of successive crystals would vary by a factor of 2.

The output signals from birefringent crystals 32 pass through a second polarizer element 34. The luminous intensities of the output signals passing through second polarizer element 34 provide measurements of the angles of rotation of the incident light signals as a result of transmission through respective birefringent crystals 32. Second polarizer element 34 may include an associated quarter wave plate 36, so that some of the output signals from crystals 32 pass through both of the second polarizer element 34 and the quarter wave plate 36. The crystal output signals which pass through both polarizer element 34 and quarter wave plate 36 form one half of a quadrature pair of signals for a particular birefringent crystal. Those crystal output signals which only pass through the second polarizer element 34 form the second half of the quadrature pair of signals. Hence, the quadrature pair of signals are 90 degrees out of phase from one another. As will be disclosed in greater detail hereinafter, utilization of these quadrature pairs improves the resolution of the processed crystal output signals. FIG. 4 of the drawings shows a more detailed enlargement of the transducer member 22 employed by the temperature sensor 20, as described above and illustrated in FIG. 3.

An output bundle 38 of incoherent illuminating optical fibers transmits the output temperature signals from the birefringent crystals 32 of transducer 22 to a conventional array of photo-electric detectors 40. Photoelectric detectors 40 are adapted to provide an electrical output signal to a decoder means 42, which output signal is representative of the optical output signal supplied by transducer 22. Photo-electric detectors 40 may be a linear array of well known charge coupled devices that are responsive to the intensities of the respective output signals eminating from birefringent crystals 32. Decoder 42 is adapted to provide a digital representation of temperature, in a coded signal format, to a utilization means such as a microprocessor, a computer, or the like for the purpose of data storage or further processing. A microprocessor may store an algorithm required for decoding the electrical output signals from detector 40. Alternatively, the decoding process could be combined as part of the overall function of a larger computer system.

The output bundle 38 includes a pair of optical fibers to correspond to each digit of the number that is the digital equivalent of the temperature that is sensed by transducer 22. Therefore, in the transmission system of FIG. 3, output bundle 38 includes eight optical fibers. Each fiber of a pair of output optical fibers transmits one half of a quadrature pair of output signals from a respective birefringent crystal 32. Although the particular number that is indicative of temperature would preferably have a binary or decimal base, the actual choice of base for the ultimately selected numbering system is optimally dependent upon the physical requirements of the temperature sensor transmission system. However, should the selected number have a relatively low base (e.g. 2), then only a signal optical output fiber is necessary to correspond to each digit thereof, because less resolution is typically required to accurately indicate the numerical equivalent of temperature. It is desirable to have a relatively high numbering base in order that the number of birefringent crystals, or digits comprising the numbering system, can be kept relatively low in magnitude. However, the base of the numbering system should be sufficiently low, so that errors in counting are not introduced.

Hence, the birefringent temperature sensor 20 herein disclosed is capable of providing a digital representation after suitable processing, of a temperature to be sensed at a remote location. The resolution of the digital signal is a function of the number of digits or crystals 32 that are utilized to implement transducer member 22. Moreover, the sensitivity of sensor 20 is a function of sensitivity of the least significant bit corresponding to the longest birefringent crystal 32.

Figure 5A:
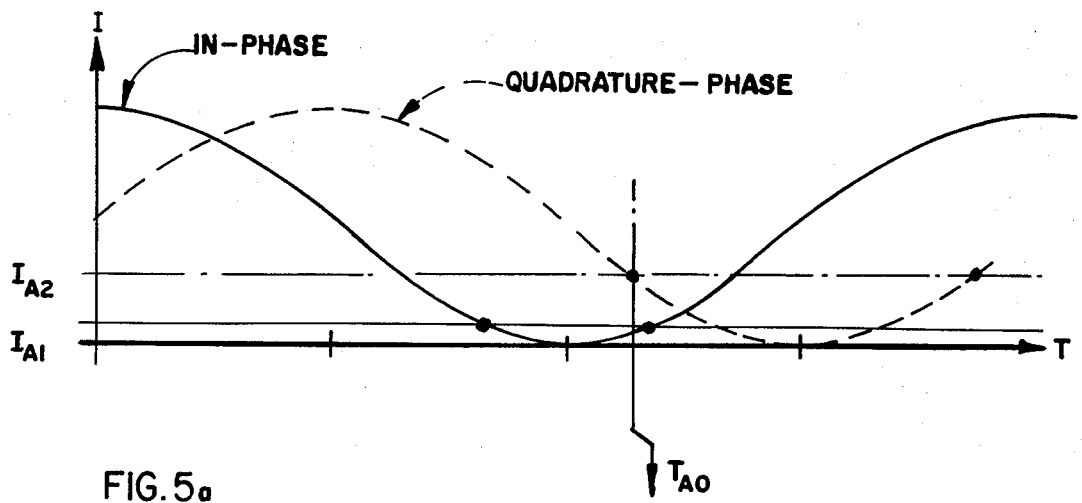
FIGS. 5a–5c of the drawings graphically illustrates the relationship between the luminous intensities of the output signals received from three different temperature sensitive crystals and the possible temperatures corresponding thereto when employing the optical transducer of FIG. 3.
Figure 5B:
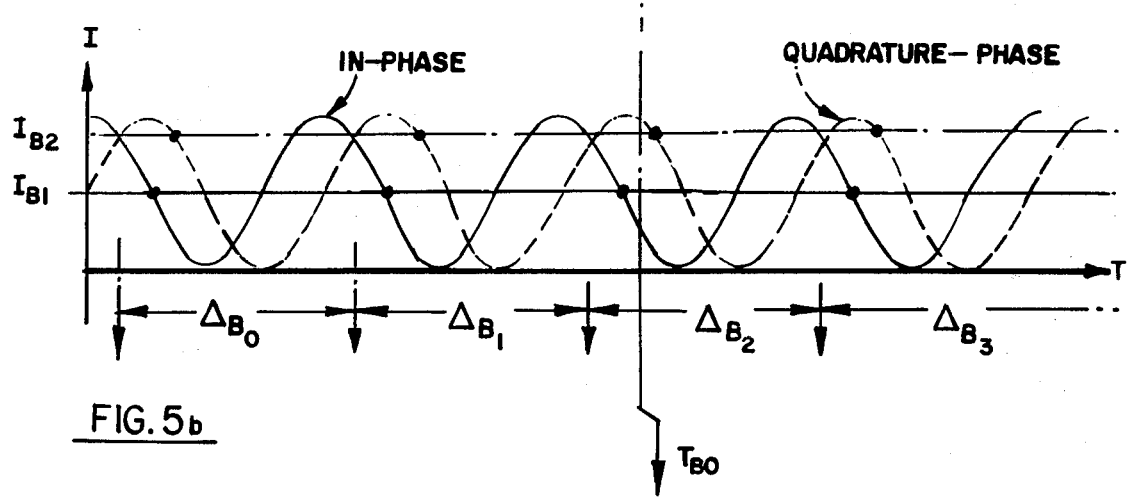
Figure 5C:
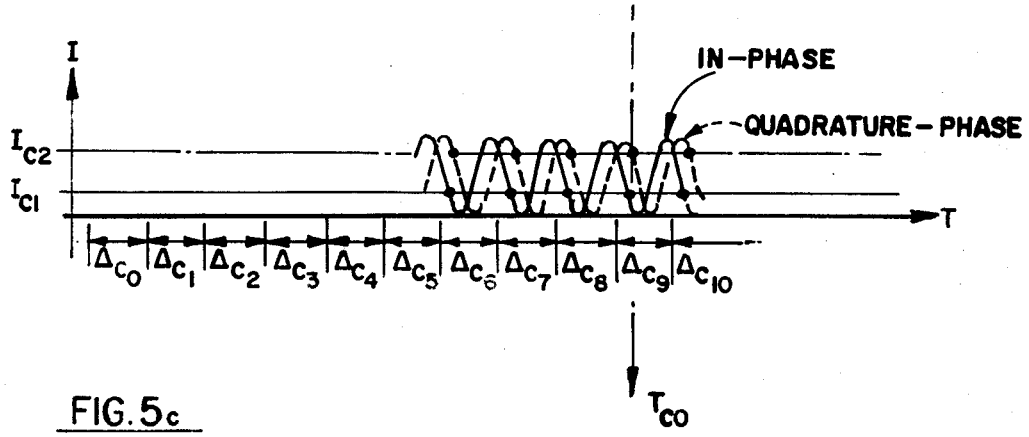

FIGS. 5a–5c of the drawings represent the ideal relationships between the luminous intensity (I) of the optical output signals and the possible temperature (T) that can be respectively sensed by three crystals (designated A, B, and C) of the birefringent temperature sensor 20 of FIG. 3. As previously disclosed, the output of each crystal A, B, and C corresponds to one digit of a number that is indicative of temperature. Referring initially to FIG. 5a, as the range of possible temperature changes with output light intensity, the in-phase (represented by a solid line) and the quadrature-phase (represented by a dashed line) components of the output signal generated by the A crystal or digit vary sinusoidally through one complete cycle. The in-phase and quadrature-phase components comprise the phase separated quadrature pair of signals (best described when referring to FIG. 3) that are transmitted from each birefringent crystal via a respective pair of output optical fibers. If the range of possible temperature shown in FIG. 5a is considered to be the maximum temperature range of the sensor, then the A crystal or digit represents the most significant bit of the numerical equivalent of temperature. By way of example, if it is assumed that the particular intensities of the in-phase and quadrature-phase components are designated $I_{A1}$ and $I_{A2}$, respectively, then the temperature indicated by the output signal of the A crystal is $T_{A0}$. The most significant bit of the numerical equivalent of temperature is determined by that temperature, $T_{A0}$, which most closely corresponds to the particular output intensities $I_{A1}$ and $I_{A2}$ of the in-phase and quadrature-phase signals. The actual temperature $T_{A0}$ is determined by those two intersections of the $I_{A1}$ and $I_{A2}$ intensities with the in-phase and quadrature-phase signals which correspond closest in temperature to one another. The $T_{A0}$ measurement provides a first approximation of temperature.

Referring now to FIG. 5b of the drawings, the output signal generated by the B birefringent crystal, or the digit that corresponds to the next most significant bit of the numerical equivalent of temperature, is more sensitive to temperature change than the output signal generated by the A crystal. For this example, over the range of possible temperatures, the luminous intensities of the in-phase and quadrature-phase components of the signal generated by the B crystal vary sinusoidally through four complete cycles ($\Delta_{B0}$–$\Delta_{B3}$). This is consistent with a digital signal to the base four. By way of example, it will be assumed that the in-phase and quadrature-phase output signals from the B crystal have the particular intensities designated $I_{B1}$ and $I_{B2}$, respectively. The $I_{B1}$ and $I_{B2}$ intensities intersect the sinusoidally varying in-phase and quadrature-phase signals at substantially identical corresponding temperatures once in each complete cycle $\Delta_{B0}$–$\Delta_{B3}$ of temperature changes.

If the system were completely error free, then one of the temperatures represented by a pair of intersections would align exactly with the temperature $T_{A0}$ sensed by the crystal A in FIG. 5a. However, if this were the case, there would be no need for successive less significant bits, inasmuch as the output signal from the first crystal A would completely yield the desired temperature. Therefore, $T_{A0}$ is a measure of the true temperature to a precision considerably less than that desired. The B crystal or digit determines the temperature with more precision, but with sufficient redundancy to increase sensing accuracy. The combination of the output signals generated by the A and B crystals produces a temperature reading which has the range of the A crystal and the precision of the B crystal. As previously described in FIG. 5a, the most significant bit corresponding to the temperature $T_{A0}$ is taken at a first approximation. An improved approximation of the temperature sensed by the sensor of FIG. 3 is provided by the B digit or the next most significant bit that is represented by the temperature $T_{B0}$. The actual temperature $T_{B0}$ is determined by the temperature sensed by the B crystal which is closest to the temperature $T_{A0}$ sensed by the A crystal. The only temperature that satisfies this requirement is that which occurs in the third temperature cycle $\Delta_{B2}$.

In a similar fashion, the digit corresponding to the output signal that is generated by the most sensitive temperature sensing birefringent crystal C further improves accuracy. By way of additional example, it is assumed that the intensities of the in-phase and quadrature-phase components of the output signal generated by the C crystal are designated $I_{C1}$ and $I_{C2}$, respectively. As illustrated in FIG. 5c of the drawings, the luminous intensities of the in-phase and quadrature-phase signals vary sinusoidally through sixteen cycles ($\Delta_{C0}$–$\Delta_{C15}$), which cycles comprise the range of the temperature sensed by the C crystal. In a manner similar to that described above, the respective intersections of the particular $I_{C1}$ and $I_{C2}$ intensities with the in-phase and quadrature-phase signals determine a series of possible temperatures sensed by crystal C. The actual temperature $T_{C0}$ sensed by the C crystal is that temperature which is closest to the temperature $T_{B0}$ sensed by the B crystal. The temperature that satisfies this requirement is that which occurs in the eighth temperature cycle $\Delta_{C9}$. Hence, the temperature $T_{C0}$ corresponsds to the least significant bit and to yet a closer approximation of the numerical equivalent of the temperature sensed by the sensor of FIG. 3.

The range of the temperature sensor of FIG. 3 may be further extended by adding a more significant bit before the A crystal or digit. Therefore, an additional birefringent crystal would be employed, which crystal would be, accordingly, less sensitive to temperature change than is the A crystal. Hence, the in-phase and quadrature-phase components of the output signal generated by such an additional crystal will, for example, extend through one complete cycle over four times the possible temperature range of the sensor, if a base four numbering system is used. Moreover, a less significant bit may be added after the C digit or crystal. This would require an additional birefringent crystal that would be more sensitive to temperature change than is the C crystal. Such an additional crystal would increase the resolution of the sensor without changing the range of sensitivity thereof.

A suitable algorithm may be chosen for decoding data that is contained in the in-phase and quadrature-phase signals generated by any single birefringent crystal. By utilizing an error analysis of the temperature sensor so as to compensate for intensity effects, such as variable optical fiber attenuation, and temperature gradients existing between crystals of adjacent significance, respective ranges of temperature values can be predicted which correspond to each of the bits that provide successively more accurate representations of temperature. Hence, each bit of information obtained from the birefringent crystals A, B, and C has a particular corresponding numerical equivalent, whereby an accurate digital representation of temperature can be achieved.

It will be apparent that while a preferred embodiment of the present invention has been shown and described, various modifications and changes may be made without departing from the true spirit and scope of the invention. It is to be recognized that the invention disclosed and claimed herein has particular utility in any application where an inexpensive, non-mechanical temperature sensor of high resolution is desirable for providing an accurate digital representation of a sample, which sample may be remotely located from the detector and decoder means. Having thus set forth a preferred embodiment of the present invention.

What is claimed is:

1. An optical transducer for sensing temperature, said transducer comprising:
   first polarizing means adapted to polarize incident light signals supplied thereto,
   temperature sensitive crystal means adapted to rotate the resulting polarization vector produced by said first polarizing means through a particular angle, which angle is proportional to temperature,
   said temperature sensitive crystal means comprising a plurality of birefringent crystals having various lengths, the respective lengths of said birefringent crystals determining the relative sensitivities thereof to temperature change, and
   second polarizing means adapted to cause the intensity of the light signals transmitted through said temperature sensitive crystal means to vary with temperature, so that the optical characteristics of output light signals from said second polarizing means are indicative of a temperature to be sensed, said temperature sensitive crystal means positioned between said first and second polarizing means.

2. The optical transducer recited in claim 1, further including quarter wave plate means interfaced with said second polarizing means, so that a first half of the light signals from said temperature sensitive crystal means is transmitted through each of said second polarizing means and said quarter wave plate means and a second half of the light signals from said temperature sensitive crystal means is transmitted only through said second polarizing means,
   said first and second halves of light signals thereby being ninety degrees out of phase from one another so as to form quadrature pairs of transducer output signals having respective amplitudes that vary sinusoidally with temperature.

3. The optical transducer recited in claim 2, further including means for detecting the amplitudes of the quadrature pairs of light signals, said amplitudes being indicative of the temperature to be sensed.

4. The optical transducer recited in claim 3, including respective fiber optic light transmitting means for supplying each half of a quadrature pair of light signals to said detecting means.

5. The optical transducer recited in claim 1, wherein those birefringent crystals having the longest lengths exhibit the greatest sensitivity to temperature change.

6. The optical transducer recited in claim 1, wherein the differences between the lengths of said plurality of birefringent crystals vary from one another according to a particular predetermined relationship.

7. An optical temperature sensor having a transducer element comprising a plurality of birefringent crystals adapted to receive a supply of incident light, said birefringent crystals varying in length relative to one another whereby to determine the respective sensitivities thereof to temperature,
   said birefringent crystals adapted to vary the optical characteristics of the incident light passing therethrough in response to a temperature change, so that said optical characteristics provide an indication of a temperature to be sensed and
   a pair of optical fibers respectively coupled with each of said plurality of birefringent crystals to transmit therefrom the varied optical characteristics of the incident light and to thereby provide said indication of temperature.

8. The optical temperature sensor recited in claim 7, further having first and second light polarizing means, said plurality of birefringent crystals positioned between said polarizing means and
   phase shifting means aligned with one of said polarizing means and one optical fiber of each of said pairs thereof, the second optical fiber of each of said pairs thereof being aligned with said one polarizing means,
   whereby each optical fiber of said pairs thereof is adapted to transmit one half of a respective quadrature pair of light signals, which signals are out of phase with one another, the luminous intensities of said pair of signals being indicative of the temperature to be sensed.

9. An optical temperature sensing system comprising:
   first light transmission means,
   light source means interfaced with said first light transmission means to supply incident light signals thereto,
   transducer means to receive the incident light signals via said first transmission means, said transducer means including a plurality of birefringent crystals having a plurality of lengths, which birefringent crystals are adapted to vary the optical characteristics of the incident light signals with changing temperature,
   those birefringent crystals having the longest lengths exhibiting the greatest sensitivity to temperature change and accordingly, having the greatest effect on the optical characteristics of the incident light signals supplied thereto,
   detector means responsive to the output light signals generated by said transducer means in order to provide a representation of a sensed temperature, and second light transmission means to supply the output light signals from said transducer means to said detector means.

10. The optical temperature sensing system recited in claim 9, wherein said first light transmission means comprises at least one optical fiber.

11. The optical temperature sensing system recited in claim 9, wherein said second light transmission means comprises at least one optical fiber.

12. The optical temperature sensing system recited in claim 9, wherein said detector means includes at least one photo-electric cell.

13. The optical temperature sensing system recited in claim 12, further including decoder means responsive to the output signals of said at least one photo-electric cell for providing a digital equivalent of the sensed temperature.

14. The optical temperature sensing system recited in claim 9, wherein said second light transmission means includes a bundle of coherent optical fibers,
a respective pair of optical fibers from the coherent bundle thereof positioned between each one of said plurality of birefringent crystals and said detector means.

15. The optical temperature sensing system recited in claim 9, said transducer means further including input and output light polarizing means,
said plurality of birefringent crystals positioned between said input and output polarizing means so that both the polarization of the input light signals supplied to said crystals and the intensity of the output light signals generated by said crystals are dependent upon a change of temperature and are controlled by said input and output polarizing means.

16. The optical temperature sensing system recited in claim 15, said transducer means further including phase shifting means interfaced with said output light polarizing means, whereby a first half of the transducer output light signals that is supplied to said detector means is also selectively transmitted through said phase shifting means and is thereby out of phase with a corresponding second half of the transducer output light signals supplied to said detector means,
said detector means responsive to the respective amplitudes of said first and second signal halves so as to provide a representation of the sensed temperature.

* * * * *